United States Patent [19]
Coury

[11] Patent Number: 4,511,376
[45] Date of Patent: Apr. 16, 1985

[54] METHOD OF SEPARATING A NONCONDENSABLE GAS FROM A CONDENSABLE VAPOR

[76] Inventor: Glenn E. Coury, 6600 W. 13th Ave., Lakewood, Colo. 80214

[21] Appl. No.: 485,598

[22] Filed: Apr. 18, 1983

Related U.S. Application Data

[63] Continuation of Ser. No. 311,810, Oct. 15, 1981, abandoned, which is a continuation of Ser. No. 138,007, Apr. 7, 1980, Pat. No. 4,330,007.

[51] Int. Cl.³ .............................................. B01D 19/00
[52] U.S. Cl. .......................................... 55/36; 55/73
[58] Field of Search ...................................... 62/23–31; 55/73, 36, 38, 52, 53, 55, 40, 57

[56] References Cited

U.S. PATENT DOCUMENTS 3,390,534 7/1968 Bergo et al. .............................. 62/31
3,407,146 10/1968 Becker et al. ........................... 62/31

OTHER PUBLICATIONS

Epri, "Extended Summaries Second Geothermal Conference and Workshop", Jun. 20–23; 1978; pp. 53–57.

*Primary Examiner*—Frank Sever
*Attorney, Agent, or Firm*—Kyle W. Rost

[57] ABSTRACT

A noncondensable gas such as $H_2S$ is removed from a condensable vapor in a two-sided heat exchanger employing multi-stage condensation or counter current flow, and the condensate so formed is employed as a cooling medium on the opposite side of the heat exchanger while itself being vaporized into a clean gas. In multi-stage condensation, a portion of the condensate is formed at each stage of a system and the condensate so formed does not progress to the next stage. In a counter current flow system, the condensate is at least temporarily retained in the condensing area so that additional noncondensable gas may be stripped from the condensate by the gaseous mixture of noncondensable gas and condensable vapor. Before condensate from either type of system is employed as a coolant, it is subjected to flash evaporation.

4 Claims, 5 Drawing Figures

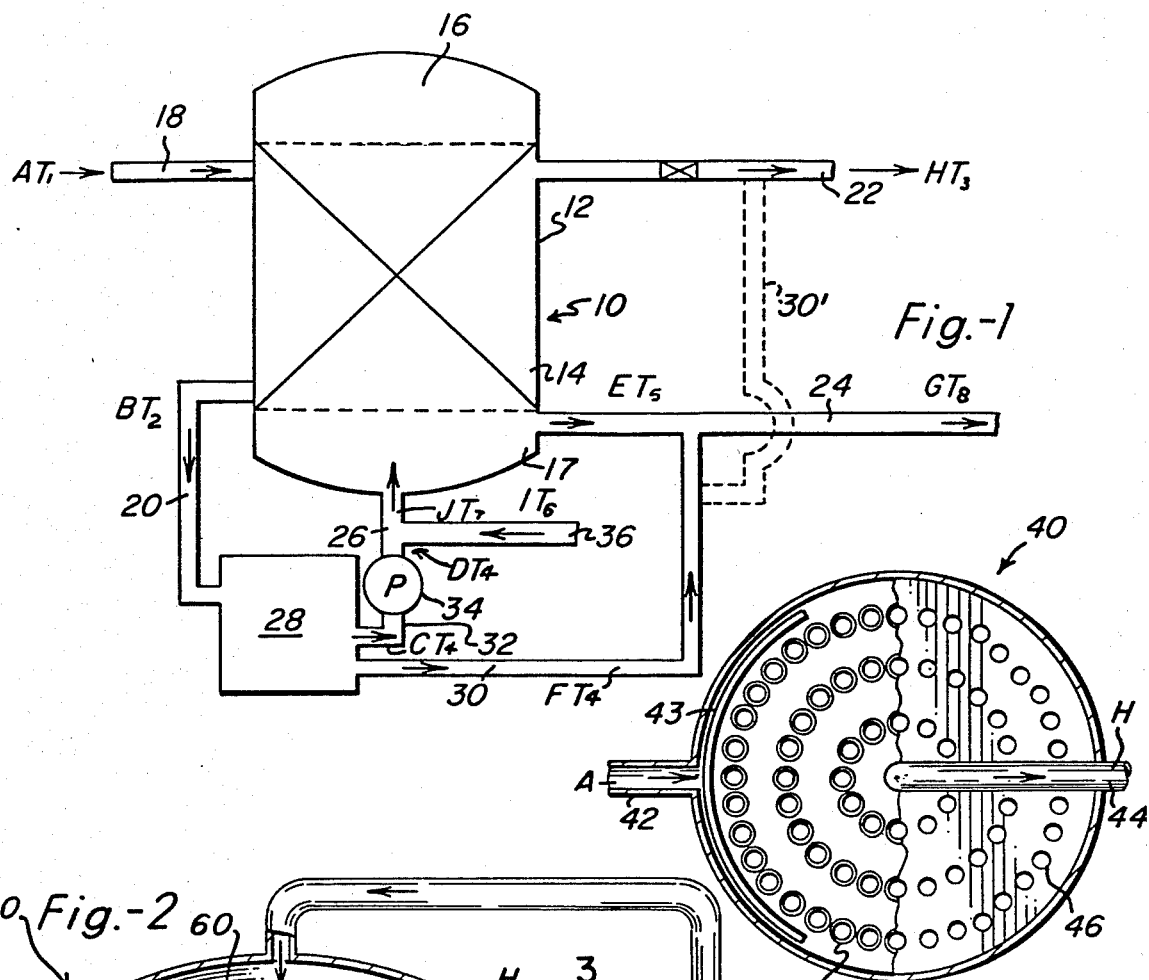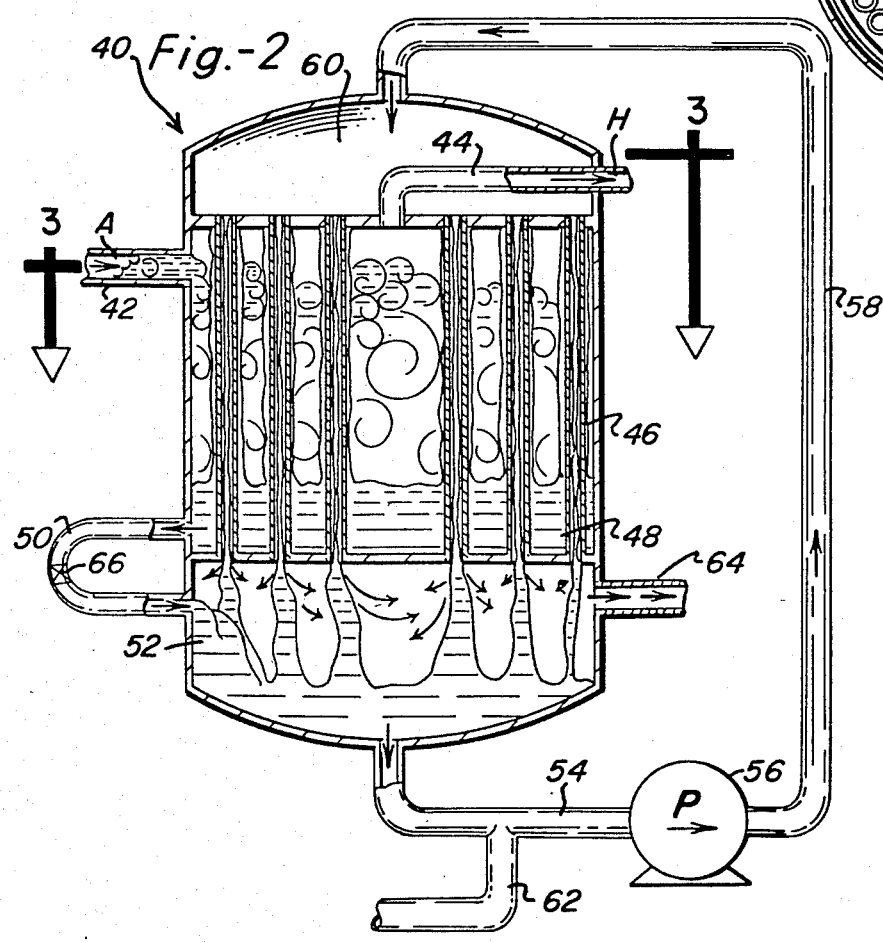

METHOD OF SEPARATING A NONCONDENSABLE GAS FROM A CONDENSABLE VAPOR

BACKGROUND OF THE INVENTION

This application is a continuation of application Ser. No. 311,810, filed Oct. 15, 1981, now abandoned, which was a continuation of application Ser. No. 138,007, filed Apr. 7, 1980, now U.S. Pat. No. 4,330,007.

1. Field of the Invention

The invention relates to gas separation with heating or cooling means for gas, with two confined fluids in indirect contact; and also to processes for gas separation of vapors and gases, especially vapors of sulfur and its compounds. The invention also relates to a system to separate noncondensable gases from condensable gases or vapors and to equipment to accomplish this separation. In particular, the invention is for removal of hydrogen sulfide gas from geothermal steam.

2. Description of the Prior Art

Geothermal steam is produced in many parts of the world and harnessed for generation of electricity, among other useful ends. The pressurized steam contains a variety of other noncondensable gases that may include carbon dioxide, ammonia, nitrogen, hydrogen, hydrocarbons, and hydrogen sulfide. After the steam passes through a turbine for generation of electricity it may be either condensed or discharged directly to the atmosphere. The various gases are partially or completely liberated to the atmosphere either directly from the condenser or during later processing of the condensate from the condenser. The $H_2S$ gas so liberated is a pollutant and is undesirable in high local concentrations.

Hot geothermal brines and water are also produced for generation of electricity and other purposes. These brines and waters may also contain dissolved gases including $H_2S$ gas. The utilization of these hot waters often involves a reduction of pressure so that part of the water flashes to steam. When this occurs, much and probably almost all of the $H_2S$, depending on the specific process conditions, will transfer into the steam phase. The potential pollution problems when the steam is processed then become similar to those when dry steam, as opposed to hot liquid, is produced from a geothermal well.

Air pollution problems due to the release of $H_2S$ gas from chemical processes have been long present and recognized. This is particularly true in the petroleum and petrochemical industries. A large number of processes for $H_2S$ removal have been developed and put into use in various commercial industries. However, none of these have been found to be particularly applicable to geothermal steam.

Several recent research efforts have attempted to remove $H_2S$ from geothermal steam or liquid. These include absorption into copper sulfate and similar solutions, and direct oxidation by adding oxygen to a liquid, $H_2S$-bearing stream. No commercially acceptable process is known to have resulted from these efforts.

With respect to the abatement of $H_2S$ emissions resulting from the use of geothermal steam, hot brines, or hot water, two specific applications of the present invention are envisioned, as described below.

When a geothermal well is drilled, whether it is in a new area or in an extension of an established well field, it is often necessary to test the well for an extended period of time. This testing generally consists of blowing steam to the atmosphere with the well bore completely open, or partially "choked" to restrict flow, and has such purposes as to estimate the size of the reservoir and the potential life of the well, as well as clean the well of loose solid matter. When testing or cleaning is satisfactorily completed, the well may be shut in until the flow from the well can be directed to a process plant. The process plant will usually not be built until several wells have been completed and tested, so that the geothermal reservoir has been proven capable of sustaining the process plant for a sufficiently long period of time to justify the expense of its construction.

During the testing of the wells, the $H_2S$ contained in the steam is emitted directly to the atmosphere. In this mode of operation, no simple and economic means is known to recover the $H_2S$ so as to prevent its emission to the atmosphere. One aspect of this invention is to provide such a means.

After construction of a process plant, geothermal steam from one or several wells will be directed to the plant. It is generally preferable to remove the $H_2S$ from the steam upstream of the process plant, where the steam is still pressurized and occupies a considerably smaller volume than it would downstream of the plant, as at the exit of a turbine. Another aspect of this invention is to provide a system for removal of $H_2S$ from geothermal steam within a process plant, preceding all or most of the plant process equipment.

The processes and devices described can also be used for the removal of various other noncondensable gases from other condensable gases and vapors differing considerably from geothermal steam. The process may also be applied downstream of other process equipment if this design configuration is preferred.

SUMMARY OF THE INVENTION

Noncondensable gas such as $H_2S$ is removed from a condensable vapor such as steam and is concentrated into a relatively small vent gas stream, with respect to the size of the incoming steam stream, for recovery. Equipment and method are applied to removal of the gas. The steam is routed into a heat exchanger where part of the steam is condensed on one side of the exchanger to form a condensate containing little of the gas, and part of the steam remains a vapor containing most of the gas in more concentrated form. The vapor is conventionally processed or disposed of in an acceptable way. The condensate is flashed into a cleaner liquid and associated vapor, and the cleaner liquid is directed to the opposite side of the heat exchanger to serve as the cooling liquid for condensing incoming steam and to itself be vaporized into a clean steam to be sent to a process plant. The associated vapor may be added to the clean steam to be sent to a process plant. The flashing of the condensate may take place in a flash tank or in the heat exchanger itself by appropriate control of pressures. In the latter instance, the associated vapor automatically becomes mixed with the clean steam and is routed to the process plant.

In particular, the gas is removed by heat exchangers employing multi-stage condensation or counter current flow. The former partially condenses steam at each stage of a system and the condensate so formed does not progress to the next stage. The heat exchanger receives the steam through a long flow path and condensate forms on condensing elements such as cooling tubes throughout the path, with the condensate from each element draining from the condensing area. As before, the condensate is re-evaporated at reduced pressure and temperature on the opposite side of the heat exchanger where it serves as the cooling liquid to continuously condense further incoming steam.

Counter current flow takes place in a heat exchanger that retains the condensate in the condensing area for at least a limited time so that additional gas may be stripped from the condensate. In one embodiment, the steam is condensed inside the tubes of a non-horizontal tube bundle as the steam enters from the bottom of the tubes and exits at the top. Condensate forms along the length of each tube and flows downwardly past the upwardly travelling steam, thereby encountering a constantly changing liquid-gas equilibrium favoring removal of gas from the condensate at increasingly lower levels in each tube. The collected condensate is transferred by suitable means to the opposite side of the heat exchanger and is sprayed against the outside of the tubes as a coolant. In another embodiment, either vertical or horizontal heat exchanger tubes condense the steam on the outside of the tubes as steam enters the shell side of the heat exchanger from the bottom and vent gas exits the exchanger from the top. Condensate either drains down vertical tubes or drips down a series of horizontal tubes to achieve the stripping action previously mentioned.

The primary object of the invention is to create an apparatus and method to recover noncondensable gases such as $H_2S$ from condensable vapors such as steam, concentrating the gases in a stream that can be handled by conventional means. It is an important object to create a commercially acceptable method of recovering such noncondensable gases, and a method that is adaptable to both single geothermal wells and larger supplies of geothermal steam as might be routed to a process plant.

Another object is to create an apparatus and process that can be applied upstream of a process plant, within a process plant, or downstream of a process plant, where a turbine-generator set may be considered a process plant.

BRIEF DESCRIPTION OF THE DRAWINGS

FIG. 1 is a schematic diagram of a typical apparatus for removal of noncondensable gases from condensable vapors.

FIG. 2 is a vertical cross-section of an apparatus for removing noncondensable gases in a multi-stage process.

FIG. 3 is a cross-sectional view of the apparatus of FIG. 2, taken along the plane 3—3 of FIG. 2.

DESCRIPTION OF THE PREFERRED EMBODIMENT

Figure 4:
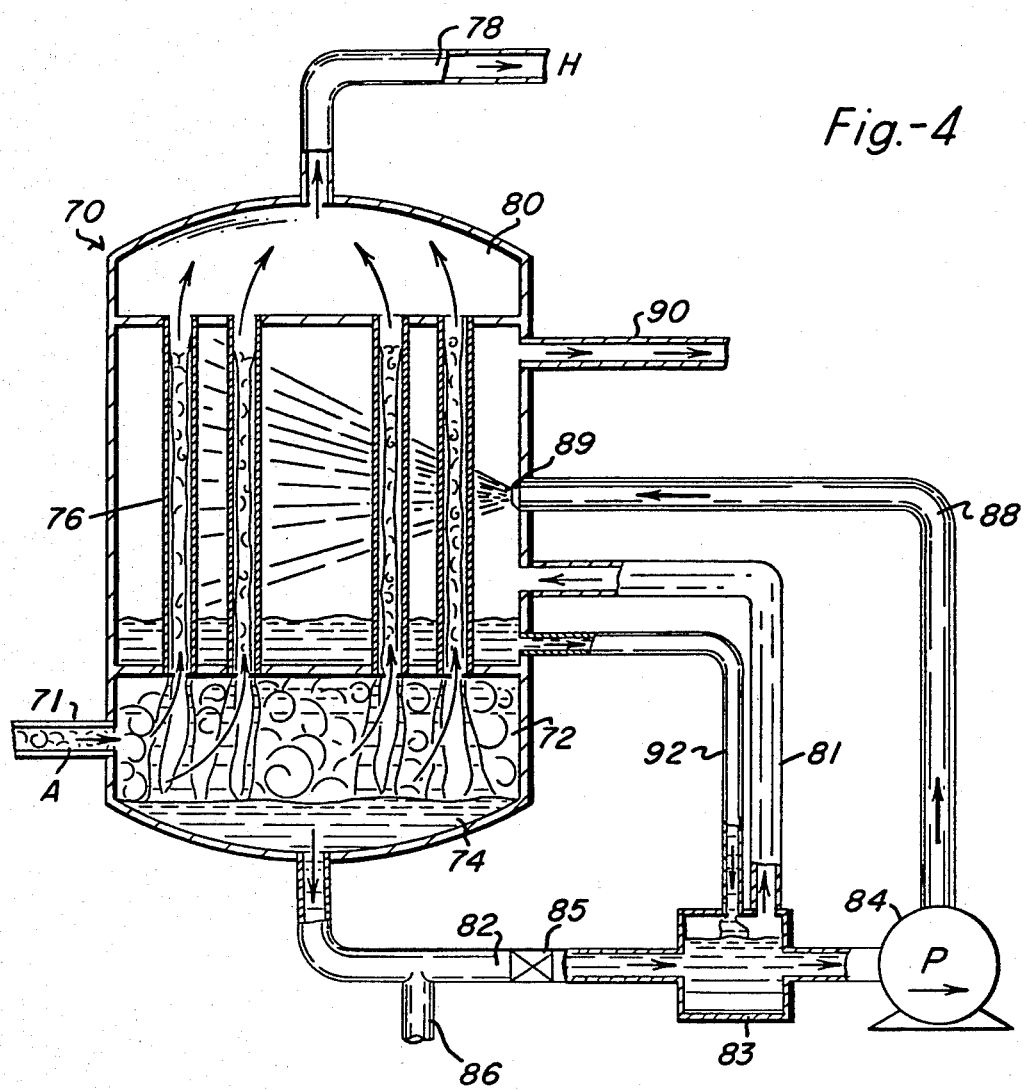
FIG. 4 is a vertical cross-section of an apparatus for removing noncondensable gases in a counter current flow process on the tube side of a heat exchanger.

Apparatus for removal of $H_2S$ or other noncondensable vapors or gases from geothermal steam or from other condensable vapors is illustrated in FIG. 1, wherein a heat exchanger 10 is of the type having a two sided configuration, which may be referred to as a shell side and a tube side. The exchanger comprises a shell or outer wall 12 that contains a tube bundle 14 opening at each end into chambers 16 and 17. The shell is connected to a geothermal steam inlet pipe 18, a condensate removal pipe 20, and a vent gas removal pipe 22. Leading out of chamber 17 is a clean steam exit pipe 24 for removal of gases from the tube side of the exchanger, and leading into chamber 17 is water inlet pipe 26.

Condensate removal pipe 20 leads from the shell side of the exchanger to a flash tank 28, which in turn has a flash tank vapor removal pipe 30 leading to the clean steam exit pipe 24. Alternatively, by means of pipe 30', the flash tank vapor can either be introduced into vent gas removal pipe 22 after a reduction in the vent gas pressure, or the flash tank vapor can be discarded. The flash tank is also connected to the flash tank condensate removal pipe 32 leading to pump 34. Water inlet pipe 26 carries condensate from the pump to the tube side of the heat exchanger at chamber 17. Clean water inlet pipe 36 supplies liquid as required to pipe 26.

The operation of the apparatus starts with the receipt of the steam A containing gases through pipe 18 at a temperature $T_1$. The steam enters the heat exchanger, for example on the shell side thereof, and most of the steam is condensed and exits the heat exchanger as condensate stream B in pipe 20 at temperature $T_2$. That portion of the steam that was not condensed exits the heat exchanger through pipe 22 as vent steam H having a temperature $T_3$. Ordinarily $T_1$ is greater than $T_2$, which is greater than $T_3$. Most of the non-condensable gases to be separated from the steam phase will exit in stream H, while a small portion of these gases will be dissolved in the condensate stream B.

The majority of the noncondensable gases such as $H_2S$ are concentrated in the vent stream H, which may be processed by conventional means to prevent ultimate escape of $H_2S$ to the atmosphere. For example, stream H may be subjected to a Klaus process, wherein the $H_2S$ is converted to sulfur, which can be stored or used as feedstock for other purposes. Alternatively, the vent stream may be reinjected into the geothermal reservoir in such a manner that its recirculation into producing geothermal wells is prevented or inhibited. Regardless of what ultimate disposition is made of the vent stream H, the size of the $H_2S$ bearing stream is greatly reduced as compared to the original size of the stream A, and the resultant stream can be easily handled. Because the $H_2S$ has been diverted from the process plant, the plant can be operated in a simplified manner with respect to noxious gas emissions abatement; also, maintenance otherwise required to combat chemical attack, or formation of scale deposits by such species as $H_2S$, $CO_2$, etc., may be significantly reduced in scope and frequency.

The heat exchanger 10 requires a cooling means to remove heat from the geothermal steam in stream A so as to effect its condensation, and in addition, a source of clean steam is required for use in the process plant in place of the original geothermal stream A. Both requirements are met by supplying a stream of clean liquid water to the opposite side of the heat exchanger from the geothermal steam, for example to the tube side of the heat exchanger. The clean stream of water supplies the necessary cooling to condense the geothermal steam while itself being vaporized to clean steam by means of heat received from the geothermal steam. A preferred source of the clean water is the condensate formed from the geothermal steam, but any exterior source of clean water can be utilized. Although the condensate will contain some dissolved undesirable gases from stream A, the concentration of these gases is sufficiently small that a pollution problem is not caused when the gases are eventually released to the atmosphere without further treatment.

For employment of the condensate stream B as the cooling means and source of clean steam, the condensate may be handled in either of two ways. According to the first, the stream B is directed through pipe 20 to flash tank 28, which is maintained at a lower pressure than the pressure at which the geothermal steam condenses. At lower pressure, a small part of the condensate vaporizes to form a vapor stream F at temperature $T_4$, while the remaining part of the condensate passes through pipe 32 as stream C at temperature $T_4$ to pump 34 after which it is fed through pipe 26 to the side of the heat exchanger 10 opposite from the geothermal steam stream for evaporation. The flashed steam from tank 28 may be routed as stream F through pipe 30 to mix with the clean steam leaving the heat exchanger through pipe 24 as stream E at temperature $T_5$, to form clean steam stream G at temperature $T_8$, which is then routed to the process plant. The flashed steam of stream F contains much of the gases dissolved in the condensate stream B. Alternatively, to create a cleaner steam to be fed to the process plant the stream F may be discarded.

The second route for handling the condensate feeds the stream B directly to the tube side of the heat exchanger without the necessity of the flash tank 28. The heat exchanger on the tube side is also maintained at a lower pressure than that of the shell side, with the result that flashing of the condensate occurs in the heat exchanger itself or in the piping upstream of it. The vapor formed in the second method passes with the clean liquid through the heat exchanger to exit with the steam formed by evaporation of the condensate. The pump 34 may not be required in this instance, depending on the specific design of the heat exchanger.

In order to balance the heat load on the heat exchanger, a small makeup stream I of clean liquid water at temperature $T_6$ may be provided through pipe 36 to mix with the condensate stream D being fed to the heat exchanger. The combined stream J at temperature $T_7$ then enters the heat exchanger at chamber 17.

The process and apparatus described in FIG. 1 will provide a cleaner steam than the geothermal steam A itself. If desired, the process may alternatively be applied to steam leaving the process plant, such as to the lower pressure steam leaving a turbine. In some instances, the clean steam so produced will not be clean enough to meet desired air pollution standards, as for example when the geothermal steam contains large amounts of ammonia gas in addition to the $H_2S$. The basic ammonia dissolved in condensate stream B will cause a relatively greater amount of the acidic $H_2S$ to be absorbed into stream B than in the case when ammonia is not present. To achieve higher rates of $H_2S$ removal through vent stream H and correspondingly lesser amounts absorbed in condensate stream B, special heat exchanger designs and methods of operation are employed, as illustrated in FIGS. 2-5.

The heat exchangers of FIGS. 2-5 provide either a multi-stage system wherein partial condensation of the steam occurs at each stage and the condensate therein produced does not progress to the next stage, a counter current system wherein flow of condensate and steam are in opposite directions, or some combination of multi-stage and counter current systems.

FIG. 2 illustrates a multi-stage system wherein steam condenses in the shell side of a vertically oriented shell and tube heat exchanger. The steam flow path in such a heat exchanger may be either crossflow, back and forth flow, radial flow from the outer circumference to the inner circumference, radial flow from the interior of the tube bundle to the outer circumference, or a combination of these methods. For example, in FIGS. 2 and 3 the heat exchanger 40 receives the geothermal steam in stream A through inlet pipe 42 leading to the shell side of the exchanger. The steam in this example flows radially inwardly, with the vent stream H exiting the exchanger at the center of the tube bundle through pipe 44. In FIG. 3, the steam deflector plate 43 provides even distribution of incoming geothermal steam for uniform radial flow toward pipe 44. Condensate forms on the outside surfaces of the tubes 46 and drains to the bottom of the shell space 48 from where it is withdrawn. The condensate formed on the first tubes to be encountered, in this instance the outer ring of tubes, is in contact with a relatively large volume of steam. Thus, according to the known principals of gas-liquid equilibrium, only a small portion of the noncondensable gases will be absorbed by the liquid of this initial condensate. At the inner ring of tubes, the mass ratio of condensate to uncondensed steam is relatively larger, with the result that the condensate formed on the inner ring of tubes will contain a proportionately larger amount of absorbed gases than the condensate formed at the outer ring. The mixture of condensate from all the tubes will contain a smaller amount of absorbed gases than would be the case if all the condensate were in contact with, and in equilibrium with, the vent gas stream H. Normal non-equilibrium conditions may cause an even greater amount of absorbed gases to be removed from the condensate.

The condensate from shell space 48 is drained through conduit 50 to lower chamber 52 on the tube side of the heat exchanger where the liquid collects in a sump and is subsequently routed through pipe 54 to pump 56 and is pumped through pipe 58 to upper chamber 60. A make up stream of clean liquid water may be delivered to pipe 54 through pipe 62. The liquid entering upper chamber 60 then flows down the inside wall surfaces of the vertical tubes 46, where the liquid serves both as the cooling means for condensing part of the geothermal steam on the opposite side of the tubes, and as the source for creation of clean steam to be routed to the process plant.

The boiling liquid inside the tubes may flow in one of several normal flow patterns, including falling film flow, upwards boiling flow with vaporization, or forced convection flow with suppressed vaporization. In the particular example of FIGS. 2 and 3, falling film flow is illustrated. The clean steam formed in the tubes enters the lower chamber 52 and is carried to the process plant through pipe 64, which is located above the condensate level in the lower chamber. As in the previous embodiment, the pressure of the condensate is reduced before the condensate is used as coolant, for example by the maintenance of a lower pressure in the tube side of the heat exchanger than in the shell side. A suitable valve 66 in conduit 50 can create the desired pressure differential. This example constitutues direct transfer of condensate from the shell side to the tube side of the heat exchanger.

Counter current flow systems may condense geothermal steam either inside or outside the tubes, and the heat exchanger may be oriented in any position between vertical and horizontal. It is necessary in a counter current flow system that the inlet geothermal steam flows in the opposite direction from the direction of condensate movement, with the inlet steam in direct contact with the condensate. Examples of counter current condensation include the heat exchanger 70 of FIG. 4, wherein the geothermal steam stream A enters the lower chamber 72 (through pipe 71) above the liquid level in sump 74 and passes into the upward sloping tubes 76 in the tube side of the exchanger. As the steam passes up the tubes, the condensable portion condenses on the tube walls and by gravity drains down the tube walls to the sump 74 counter to the flow of steam. The condensate is cleaned during its downflow by continuously changing equilibrium with the upflowing steam in the tubes 76. The upwardly flowing steam exits the upper end of the tubes as vent gas stream H to be carried away through pipe 78 connected to upper chamber 80. The condensate is directly removed through removal pipe 82 to a reservoir 83 from which pump 84 draws. A pressure reducing valve 85 equalizes the pressure of the two condensate streams flowing into the reservoir 83. Vapor produced by the pressure reducing operation is transported from the reservoir to the shell side of the heat exchanger via pipe 81. Make up liquid is received as necessary from pipe 86. The pump supplies condensate from the reservoir via pipe 88 to the shell side of the tube bundle, where the condensate is distributed on the tubes. One method of distribution is the spray nozzle 89. Clean steam created on the shell side of the heat exchanger is removed through pipe 90 and sent to the process plant. Liquid condensate not evaporated into clean steam is collected at the bottom of the shell side and removed via pipe 92 back to the reservoir.

In the operation of a counter current flow system as illustrated in FIG. 4 wherein the noncondensable gases are stripped on the tube side of the heat exchanger it may be preferable to place the tube bundle between vertical and an acute angle to the horizontal, such as between zero and fifteen degrees with a low angle such as five degrees being desirable. The nearly horizontal direction of the tubes permits the cooling condensate to drip through the tube bundle to reach all tubes in the tube bundle.

Figure 5:
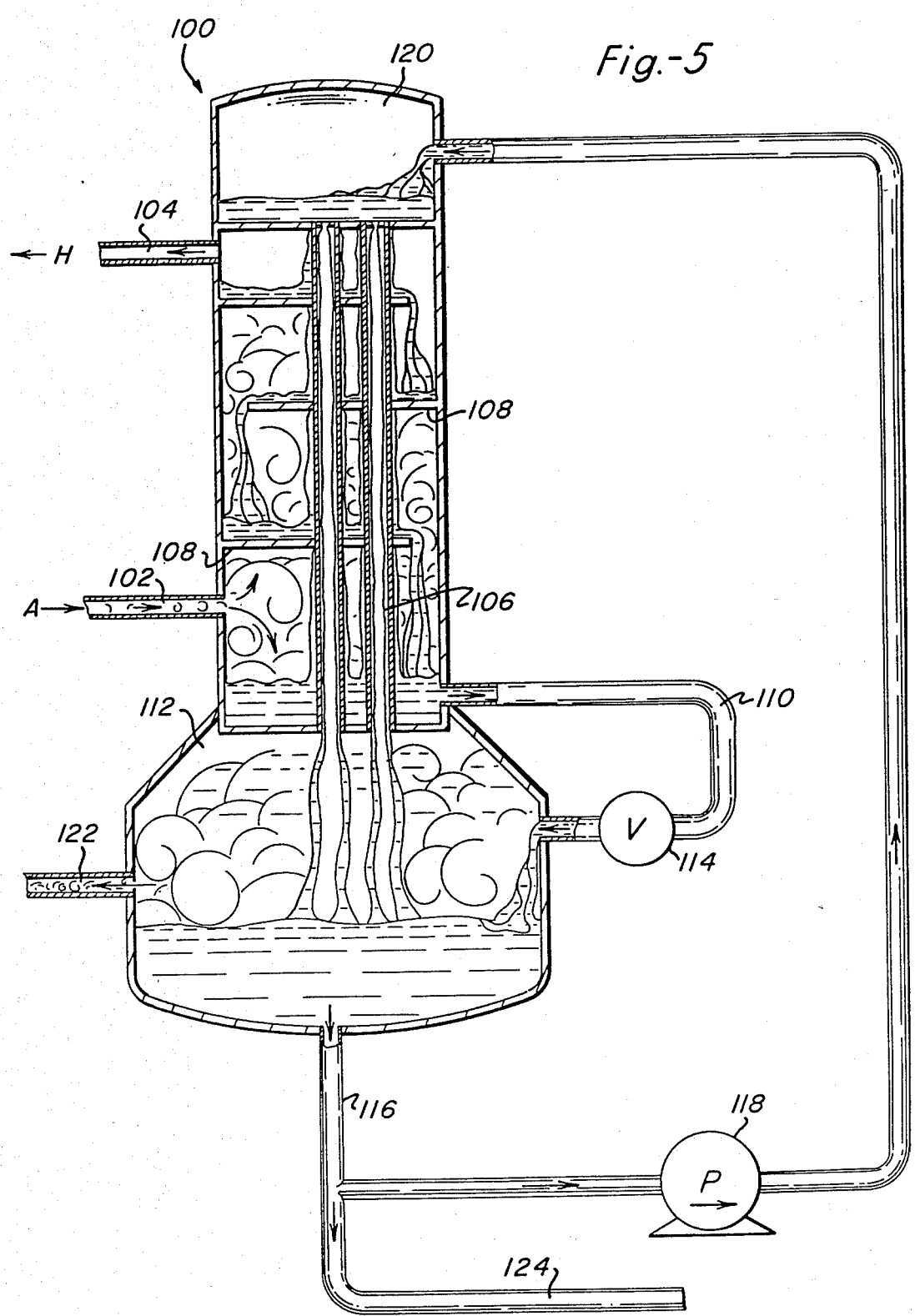
FIG. 5 is a vertical cross-section of an apparatus for removing noncondensable gases by crossflow on the shell side of a heat exchanger.

Crossflow may be applied to a system that condenses steam on the outside of the heat exchanger tubes. FIG. 5 illustrates a heat exchanger 100 of the shell tube type wherein the geothermal steam stream A is received through pipe 102 near the bottom of the exchanger and travels upwardly through the vertical tube bundle to vent pipe 104 near the top of the exchanger. In this arrangement, the condensate formed on tubes 106 drains by gravity against the flow of steam. Baffle plates 108 may be used to interrupt the steam path by causing the steam to travel from side-to-side as it travels toward the top of the shell, and these plates are preferably spaced with increasing closeness toward the top of the shell, corresponding to the decrease in steam quantity because of the condensation that has taken place at lower levels. This arrangement increases the efficiency of the noncondensable gas stripping process. Condensate is gathered at the bottom of the shell volume and removed from the shell by pipe 110 to chamber 112 maintained at a lower pressure than the shell side of the exchanger by valve 114 in pipe 110. Chamber 112 is both a flash chamber and storage reservoir for condensate, which is then drawn off through pipe 116 to pump 118 and pumped to upper chamber 120, which is connected to the tube side of the exchanger. The condensate drains through the tubes from chamber 120 to chamber 112, cooling the geothermal steam while itself being evaporated into clean steam, which is drawn from the lower chamber by pipe 122 leading to the process plant or other end user. Blowdown tube 124 permits disposal of excess condensate from chamber 112. In this configuration an intermediate condensate flash tank could be utilized in pipe 110, as described earlier with reference to FIG. 1, to flash and segregate a small portion of vapor containing most of the noncondensable gases described in the shell side condensate.

If the tube bundle of FIG. 5 were horizontally disposed, the geothermal steam would flow upwardly in the shell and perpendicular to the tube axes, and vent gas would again be removed from the top of the shell volume. Condensate forming on the exterior of a horizontal tube would drain to the bottom side of the tube and drip to the lower tubes, finally reaching the liquid sump in the bottom of the shell. Cooling condensate may be supplied to the horizontal tubes by a pump, and other parts arranged to accomodate the variation in the orientation of the tube bundle with respect to the direction of gravitational force from the arrangement of FIG. 5.

The process and equipment previously described is applicable to geothermal steam feeding or leaving a process plant. A similar application can be made for a single geothermal well or a set of wells that are under test or for other reasons are blowing steam to the atmosphere. In this instance, a portable heat exchanger is connected to the steam output from the single well or set of wells. The system will operate as previously described for FIG. 1, except that the clean steam, instead of being directed to a process plant, will be discharged to the atmosphere. Since optimization of heat recovery is not a significant factor in this case, a much smaller heat exchanger may be employed than is required for a process plant. When a portable exchanger is being used on a single well or set of wells, the vent gas stream H must be disposed of in a satisfactory way. There may be no suitable $H_2S$ recovery system such as a Klaus plant in the near vicinity of the well or wells as there would be in the vicinity of a process plant. In this instance, the concentrated gases could be injected into another disposal well.

I claim:
1. The method of producing a clean steam from a gaseous mixture of steam and noncondensable gas including $H_2S$ by separating the noncondensable gas from the steam in a continuous process, comprising:
  (a) condensing steam from the gaseous mixture of steam and noncondensable gas on the first side of a two sided heat exchanger to form a condensate and a vent gas by
    (1) directing the gaseous mixture along a flow path having condensing elements therein, and
    (2) directing the condensate formed on said condensing elements in a substantially counter current flow to said flow path of the gaseous mixture so that the uncondensed gaseous mixture following the flow path strips noncondensable gases including substantially all of said $H_2S$ from the condensate;
  (b) removing the vent gas from the first side of the heat exchanger;

(c) removing the condensate from the first side of the heat exchanger;

(d) evaporating a portion of the condensate so removed by subjecting the condensate to a lower pressure than the pressure at which the gaseous mixture condenses; and (e) cooling the second side of the heat exchanger with the liquid condensate remaining after the evaporating step while evaporating said remaining condensate into a clean steam containing relatively less noncondensable gas than said original gaseous mixture.

2. The methed of claim 1, wherein the heat exchanger comprises a tube bundle axially oriented non-horizontally and receiving the gaseous mixture into the lower ends of the tubes in the bundle for gravity induced counter-current flow of the condensate out of the lower ends of the tubes, and wherein the method further comprises collecting the condensate from the lower ends of the tubes and distributing the collected condensate on the outside of the tubes.

3. The method of claim 1, wherein said tube bundle is axially oriented at an angle between zero and fifteen degrees to the horizontal and the condensate is applied from the vertically top side of the tubes.

4. The methed of claim 1, wherein said heat exchanger comprises a substantially vertical tube bundle surrounded by a shell, and the flow path is from the bottom to the top of the heat exchanger on the shell side thereof.

* * * * *